United States Patent
Anvari

(10) Patent No.: US 7,729,420 B1
(45) Date of Patent: Jun. 1, 2010

(54) RECONDITIONING EQUALIZER FILTER FOR OFDM AND NON-OFDM SIGNALS

(75) Inventor: Kiomars Anvari, 1567 Serafix Rd., Alamo, CA (US) 94507

(73) Assignee: Kiomars Anvari, Alamo, CA (US)

( * ) Notice: Subject to any disclaimer, the term of this patent is extended or adjusted under 35 U.S.C. 154(b) by 791 days.

(21) Appl. No.: 11/603,727

(22) Filed: Nov. 24, 2006

(51) Int. Cl.
- H03H 7/30 (2006.01)
- H04L 27/08 (2006.01)
- H03F 3/66 (2006.01)
- H03F 1/26 (2006.01)
- H03F 1/00 (2006.01)
- H04B 1/04 (2006.01)

(52) U.S. Cl. .......... 375/232; 375/229; 375/345; 330/52; 330/149; 330/151; 455/114.2; 455/114.3; 455/127.2

(58) Field of Classification Search ......... 375/232–233, 375/260, 285, 295–297, 229; 455/194.2, 455/114.2, 114.3, 127.2; 330/149, 52, 151
See application file for complete search history.

(56) References Cited

U.S. PATENT DOCUMENTS

| | | | | |
|---|---|---|---|---|
| 5,485,120 A | * | 1/1996 | Anvari | 330/151 |
| 5,594,385 A | * | 1/1997 | Anvari | 330/149 |
| 6,285,412 B1 | * | 9/2001 | Twitchell | 348/608 |
| 7,142,831 B2 | * | 11/2006 | Anvari | 455/114.2 |
| 7,146,138 B2 | * | 12/2006 | Anvari | 455/114.3 |
| 7,394,849 B2 | * | 7/2008 | Ibragimov et al. | 375/233 |
| 7,460,613 B2 | * | 12/2008 | Sahlman | 375/296 |
| 2004/0203540 A1 | * | 10/2004 | Anvari et al. | 455/114.3 |
| 2004/0232985 A1 | * | 11/2004 | Itahara | 330/149 |
| 2005/0113052 A1 | * | 5/2005 | Rabinovich et al. | 455/194.2 |
| 2005/0157814 A1 | * | 7/2005 | Cova et al. | 375/297 |
| 2005/0185723 A1 | * | 8/2005 | Anvari | 375/260 |
| 2007/0195909 A1 | * | 8/2007 | Ishikawa et al. | 375/285 |

* cited by examiner

Primary Examiner—Mohammad H Ghayour
Assistant Examiner—Eboni Giles

(57) ABSTRACT

A technique for a reconditioning equalizer filter for OFDM and non-OFDM signals is described. The input to a transmitter chain is modified by a reconditioning equalizer filter, prior to being applied to the transmitter. The reconditioning equalizer filter modifies and smoothen the amplitude of the signal. The modified and smoothen signal has its peaks reduced which results to lower Crest Factor. The input to the reconditioning equalizer filter could be a baseband, an intermediate frequency (IF) or radio frequency (RF) signal. When the signal is an IF or RF signal it needs to be down converted to baseband before applied to reconditioning equalizer filter.

7 Claims, 5 Drawing Sheets

RECONDITIONING EQUALIZER FILTER FOR OFDM AND NON-OFDM SIGNALS

BACK GROUND OF INVENTION

The present invention relates to a reconditioning equalizer filter to reduce crest factor of baseband signal of any Orthogonal Frequency Division Multiplexing (OFDM) and non-OFDM communication transmitter. The reconditioning equalizer filter input could be baseband, intermediate frequency (IF), or RF signal and its output is the peak reduced and smoothen baseband signal that can be up converted to IF or RF. In any OFDM and non-OFDM communication system one of the critical sub-systems is the transmitter. This sub-system has a major contribution in cost, power consumption, and size of the system. The main reason is the requirement of communication transmitter sub-system for linear components. The higher the linearity, the higher the power consumption, cost and size. In order to minimize the cost, size and power consumption there is a need for techniques that overcome this problem. This invention conquers these challenges by using a simple and accurate reconditioning equalizer filter module used at the input to this sub-system.

SUMMARY OF INVENTION

According to the invention, a reconditioning equalizer filter, for use with OFDM and non-OFDM communication transmitter sub-system, uses a plurality of simple and accurate algorithm in conjunction with intelligent signal processing to improve signal handling of any wireless, optical, or wireline communication transmitter. By intelligent, it is meant that the algorithm has features of maintaining the signal emission and quality requirements while applying the reconditioning equalizer filter. The enhanced reconditioning equalizer filter uses the transmitter sub-system input which could be a baseband, an IF or RF signal as its input and conditions and smoothens the signal before applying to the transmitter sub-system. The conditioning and smoothening helps to boost the power handling of the transmitter sub-system or acts more linearly. The inputs to the reconditioning equalizer filter should be within a limit that can be handled by the reconditioning equalizer filter.

In a particular embodiment, the reconditioning equalizer filter algorithm comprises a signal processing module. The signal processor performs the signal conditioning and smoothening.

The invention will be better understood by reference to the following detailed description in conjunction with the accompanying drawings.

DESCRIPTION OF THE SPECIFIC EMBODIMENTS

In a first preferred embodiment of the invention, the reconditioning equalizer filter uses sub-harmonic sampling to convert RF or IF signals to digital baseband signal. In a second preferred embodiment the main baseband signal is amplitude conditioned and smoothened using a reconditioning equalizer filter. In a third embodiment the reconditioning equalizer filter injects in band and out of band signal injected into the main baseband signal through a feedforward loop. In a fourth embodiment the injected in band and out of band signal into the main baseband signal is adjusted by a convolution filter in a feedforward loop. In a fifth embodiment the injected in band and out of band signal into the main baseband signal is gain adjusted in a feedforward loop. In a sixth embodiment the convolution filter in a feedforward loop uses Discrete Fourier Transform and Inverse Discrete Fourier Transform DFT/IDFT. In a seventh embodiment the convolution filter uses a low pass filter before or after the convolution function. In a eighth embodiment one of the convolving signals used in the convolution filter is the normalized DFT of the delay and gain adjusted main baseband input signal to reconditioning equalizer filter. In a ninth embodiment one of the convolving signals used in convolution filter is a pre-configured frequency domain signal. In a tenth embodiment the out put of the reconditioning equalizer filter is used as the new input to the transmit sub-system.

Figure 1:
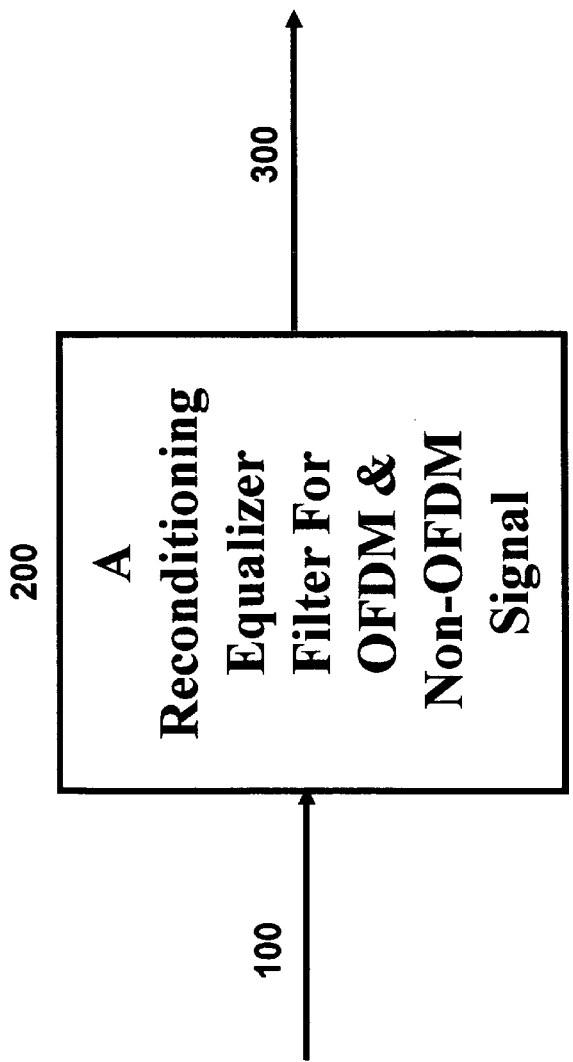
FIG. 1 is an overall block diagram of the reconditioning equalizer filter

Referring to FIG. 1, a reconditioning equalizer filter for OFDM and Non-OFDM signal diagram is illustrated. The reconditioning equalizer filter 200 receives its baseband input 100 and produce reconditioned and smoothened output baseband signal 300. The reconditioning equalizer filter performs the following functions:

1. Condition and smoothen the amplitude of the input baseband signal 100 before applying to transmitter sub-system.
2. Adjust the gain in the signal paths to keep the total gain from input to output of the enhanced reconditioning equalizer filter unity.

Figure 2:
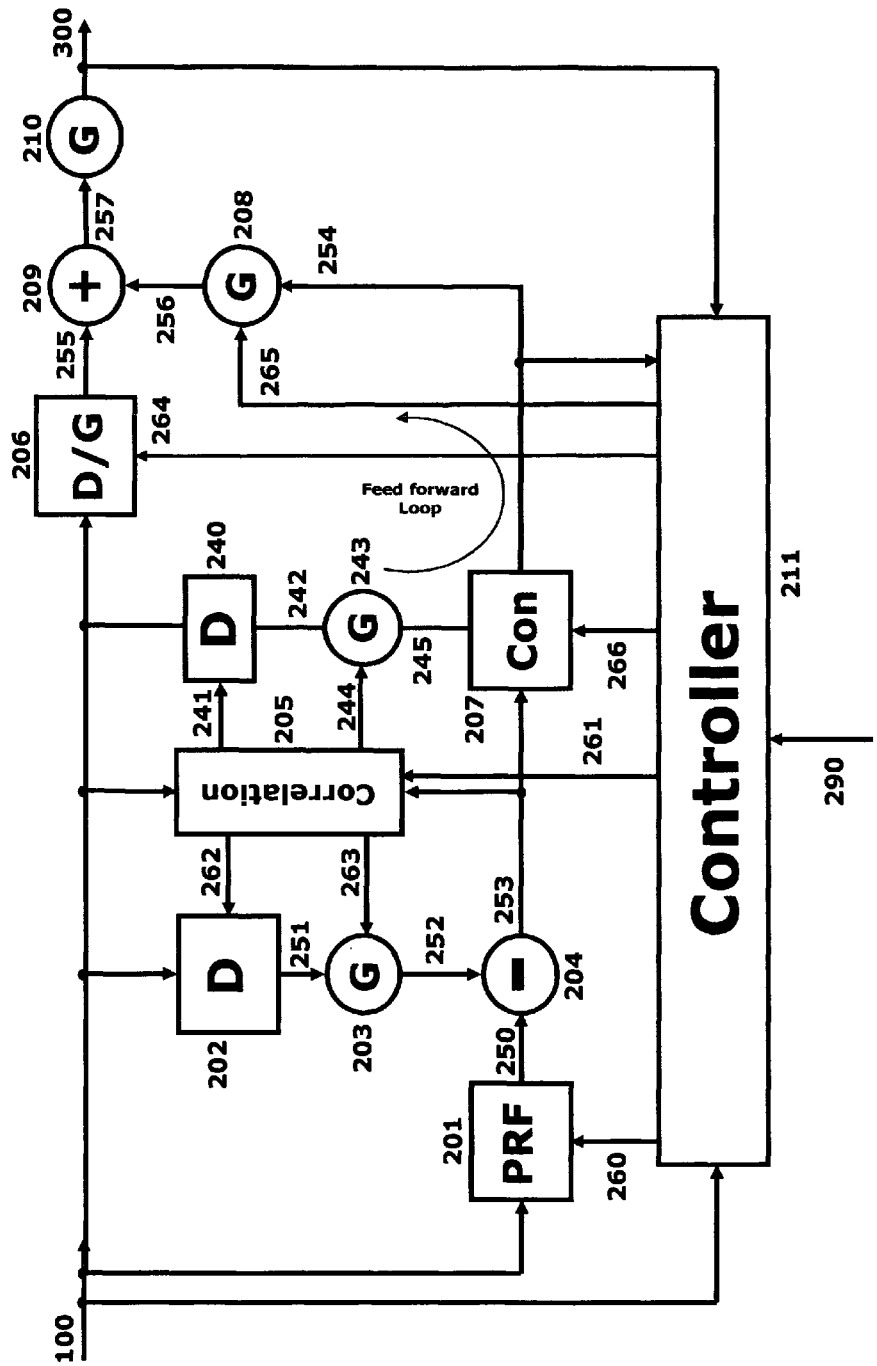
FIG. 2 is the detail block diagram of the reconditioning equalizer filter with convolution filter in a feedforward loop

FIG. 2 illustrates the detail block diagram of the reconditioning equalizer filter unit. The received main baseband signal 100 is applied to Peak Reduction Filter (PRF) 201 to produce peak reduced main baseband signal 250. The PRF 201 receives control signal 260 from controller 211 to adjust the amount of peak reduction. The main baseband signal 100 is delayed in delay function 202 to produce delayed main baseband signal 251. The delayed main baseband signal 251 is gain adjusted in gain function 203 to produce delay and gain adjusted main baseband signal 252. The delay and gain adjusted main baseband signal 252 is subtracted from peak reduced baseband signal 250 in subtraction function 204 to produce baseband signal 253. The amount of delay 262 and gain adjustment 263 are calculated by the correlation function 205 that uses main baseband signal 100 and signal 253 as its input. The correlation block 205 also receives a control signal 261 from controller block 211 to use to calculate the delay value 262 and gain adjustment value 263. The baseband signal 253, subtraction of peak reduced main baseband signal and delay and gain adjusted main baseband signal, is applied to convolution filter 207 to attenuate any out of band signal and unwanted signal and produce in-band baseband signal 254. The input into convolving filter 207 could be the delay and gain adjusted main baseband signal or pre-configured frequency domain signal from controller 211. The main baseband signal 100 can be delay adjusted by delay block 240 and gain adjusted by gain block 243 to produce gain and delay adjusted main baseband signal 245 before being applied to convolution filter 207. The pre-configured frequency domain signal 266 from controller 211 used by convolution filter 207 can be set during configuration or dynamically during operation. The in-band baseband signal 254 is gain adjusted by gain block 208 to produce gain adjusted in-band baseband signal 256. The amount of gain adjustment 265 is supplied by controller function 211. The main baseband signal 100 is delay and gain adjusted by delay/gain block 206 to produce delay and gain adjusted main baseband signal 255. The delay and gain adjusted main baseband signal 255 and the gain adjusted in-band basband signal 256 are summed in summation function 209 to produce modified main baseband signal 257. The modified main baseband signal 257 is gain adjusted by gain function 210 to produce reconditioned and smoothen baseband signal 300. The main baseband signal 100 and the reconditioned and smoothen baseband signal 300 are applied to controller 211 to provide the gain and delay parameters needed for the gain function, peak reduction and the correlation functions.

Figure 3:
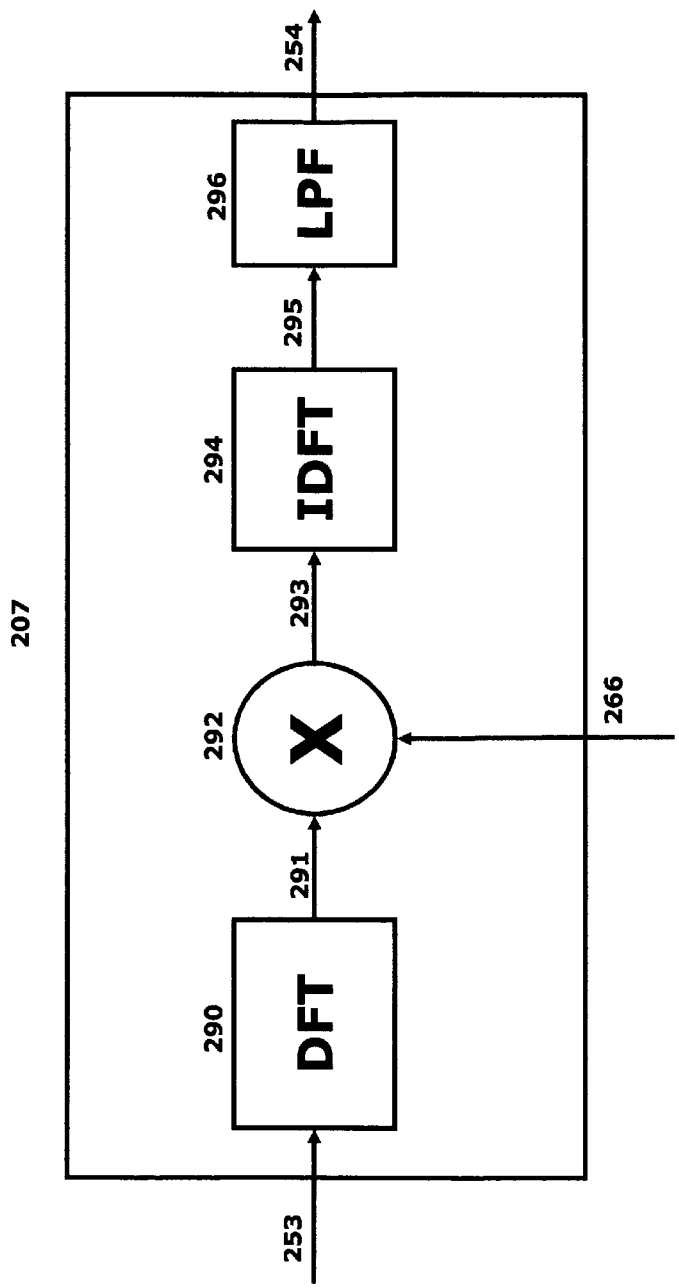
FIG. 3 is the detail block diagram of convolution filter followed by a low pass filter used in the feedforward loop

FIG. 3. illustrates the detail block diagram of the convolution filter function 207 having a low pass filter following a convolution function. The baseband signal 253 which is the result of subtraction of delay and gain adjusted main baseband signal and peak reduced main baseband signal is applied to Discrete Fourier Transform (DFT) function 290 to produce the frequency domain signal 291. The frequency domain baseband signal 291 is multiplied with the pre-configured frequency domain baseband signal 266 in multiplier 292 to produce new frequency domain baseband signal 293. The new frequency domain baseband signal 293 is transformed to time domain by Inverse Discrete Fourier Transform (IDFT) block 294 to produce the new time domain baseband signal 295. The new time domain baseband signal 295 is low pass filtered by function 296 to produce the in band baseband signal 254.

Figure 4:
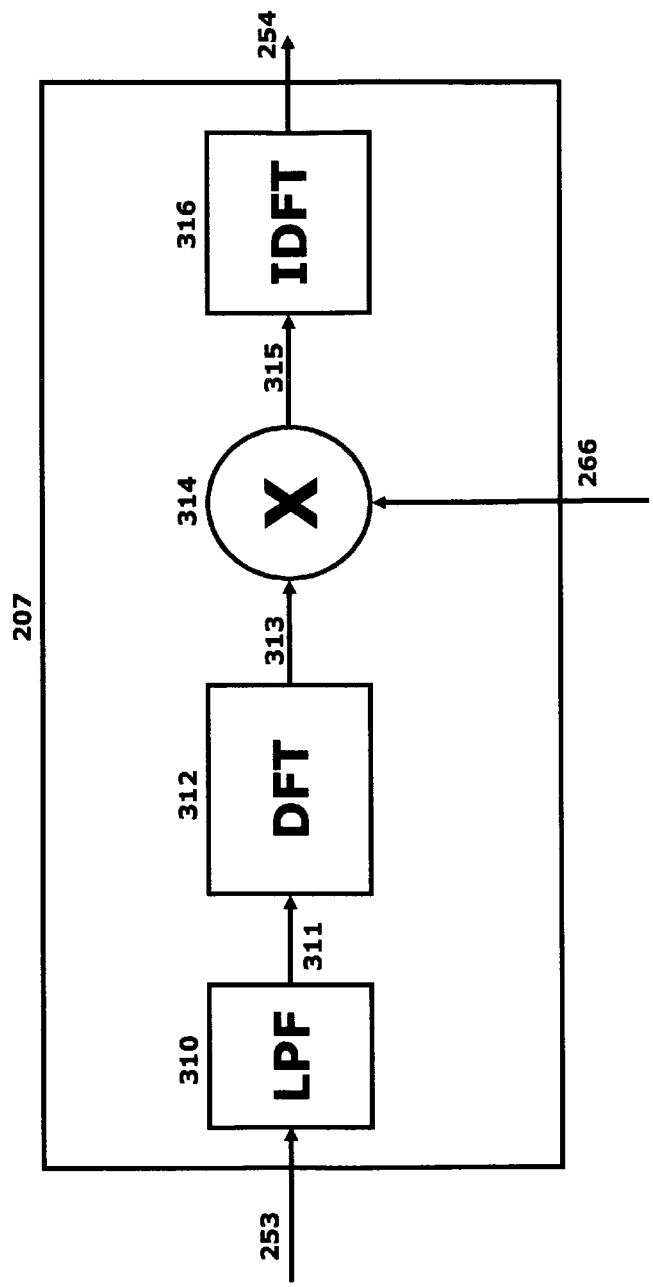
FIG. 4 is the detail block diagram of convolution filter proceed by a low pass filter used in feedforward loop

FIG. 4. illustrates the detail block diagram of the convolution filter function 207 with a low pass filter proceeding the convolution function. The baseband signal 253 which is the result of subtraction of delay and gain adjusted main baseband signal and peak reduced main baseband signal is applied to low pass filter 310 to produce filtered signal 311. The filtered signal 311 is applied to Discrete Fourier Transform (DFT) function 312 to produce 313, the frequency domain of low pass filtered subtraction of delay and gain adjusted main baseband signal and peak reduced main baseband signal. The frequency domain baseband signal 313 is multiplied with the pre-configured frequency domain baseband signal 266 in multiplier 314 to produce new frequency domain baseband signal 315. The new frequency domain baseband signal 315 is transformed to time domain by Inverse Discrete Fourier Transform (IDFT) block 316 to produce the in band baseband signal 254.

Figure 5:
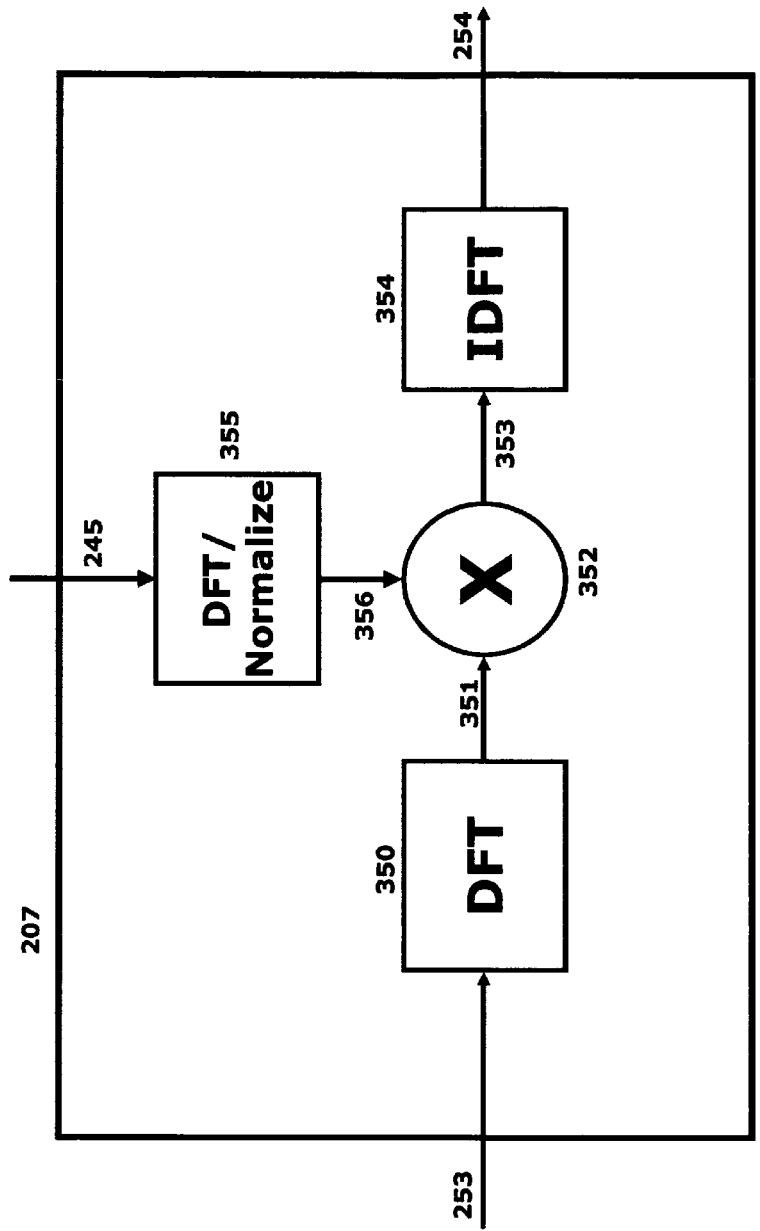
FIG. 5 is the detail block diagram of convolution filter using main baseband signal as one of the convolving signals used in feedforward loop

FIG. 5. illustrates the detail block diagram of the convolution filter function 207 with no low pass filter. The baseband signal 253 which is the result of subtraction of delay and gain adjusted main baseband signal and peak reduced main baseband signal is applied to Discrete Fourier Transform (DFT) function 350 to produce the frequency domain signal 351. The frequency domain baseband signal 351 is multiplied with the frequency domain and normalized main baseband signal 356 in multiplier 352 to produce new frequency domain baseband signal 353. The main baseband signal after being delay and gain adjusted is applied to Discret Fourier Transform (DFT) and normalization function 355 to produce frequency domain and normalized main baseband signal 356. The new frequency domain baseband signal 353 is transformed to time domain by Inverse Discrete Fourier Transform (IDFT) function 354 to produce the in band baseband signal 254.

What is claimed is:

1. A reconditioning equalizer filter to condition and smoothen a main baseband signal to improve the performance of a transmit path, for use with Orthogonal Frequency Division Multiplexing (OFDM) and Non-OFDM signals to enhance the performance of any communication transmitter, in any wireless cellular, Personal Communication System (PCS), wireless Local Area Network and Wireless Wide Area Network (LAN/WAN), WiMax, Video and Audio Wireless Broadcasting, line of sight microwave, military, optical, satellite communication systems and any other wireless applications, the reconditioning equalizer filter comprising:

a peak reduction filter that performs peak reduction filtering to produce a peak reduced main baseband signal;

a feedforward loop that injects a controlled in band and out of band baseband signal into the main baseband signal;

a gain element that adjusts the gain of the main baseband signal;

a delay element that adjusts the delay of the main baseband signal;

a second gain element that adjusts the gain of sum of the delay and gain adjusted main baseband signal and the injected baseband signal;

a controller that uses the main baseband signal, the output of reconditioning equalizer filter, and external information to provide control signals to various delay and gain functions as well as the peak reduction filter, the correlation function and a convolution filter;

a digital baseband convolution filter which uses a Discrete Fourier Transform (DFT) or Fast Fourier Transform (FFT) of the result of the subtraction of the delay and gain adjusted main baseband signal and the peak reduced main baseband signal as a first input and the normalized Discrete Fourier Transform (DFT) or Fast Fourier Transform (FFT) of the delay and gain adjusted main baseband signal as a second input to its multiplier, wherein the digital baseband convolution filter comprising:

a DFT or FFT function that converts the time domain subtraction of the delay and gain adjusted main baseband signal and the peak reduced main baseband signal to frequency domain;

a DFT or FFT function that converts the time domain delay and gain adjusted main baseband signal to frequency domain;

a normalization function that normalizes the frequency components of the delay and gain adjusted main baseband signal produced by DFT (or FFT) of the delay and gain adjusted main baseband signal to predefined values based on defined or configured thresholds;

a multiplier that multiplies the normalized DFT or FFT of the delay and gain adjusted main baseband signal and DFT (or FFT) of the subtraction of the delay and gain adjusted main baseband signal and the peak reduced main baseband signal;

an IDFT or IFFT function that converts the output of a multiplier that multiplies the normalized DFT (or FFT) of the delay and gain adjusted main baseband signal and DFT (or FFT) of the subtraction of the delay and gain adjusted main baseband signal and the peak reduced main baseband signal to time domain.

2. The reconditioning equalizer filter according to claim 1, wherein the out of band baseband signal is adjusted by a configurable convolution filter in a feedforward loop that injects a controlled in band and out of band baseband signal into main baseband signal, a feedforward loop comprising:
  a subtractor that subtracts the delay and gain adjusted main baseband signal and the peak reduced main baseband signal in a feedforward loop;
  a correlation function that correlates the main baseband signal and the result of the subtraction of the peak reduced main baseband signal and the delay and gain adjusted main baseband signal to calculate the amount of the delay and gain adjustment for the main baseband signal in a feedforward loop;
  a digital baseband convolution filter that uses the delay and gain adjusted main baseband signal and the result of the subtraction of the delay and gain adjusted main baseband signal and the peak reduced main baseband signal as its input to produce a baseband signal in a feedforward loop for injection into the main baseband signal;
  a digital baseband convolution filter that uses a pre-configured frequency domain baseband signal and the result of the subtraction of the delay and gain adjusted main baseband signal and the peak reduced main baseband signal as its input to produce a baseband signal in a feedforward loop for injection into the main baseband signal;
  a digital baseband convolution filter with configurable amount of filtering that filters the result of the subtraction of the delay and gain adjusted main baseband signal and the peak reduced main baseband signal to produce a baseband signal in a feedforward loop for injection into the main baseband signal;
  a third gain element that gain adjusts the convolution filtered subtraction of the peak reduced main baseband signal and the delay and gain adjusted main baseband signal in a feedforward loop;
  a delay/gain adjustment element that delay and gain adjusts the main baseband signal in the reconditioning equalizer filter;
  a summer that adds the delay and gain adjusted main baseband signal and gain adjusted and convolution filtered subtraction of the peak reduced main baseband signal and the delay and gain adjusted main baseband signal from a feedforward loop.

3. The reconditioning equalizer filter according to claim 1, wherein the digital baseband convolution filter uses Discrete Fourier Transform (DFT) or Fast Fourier Transform (FFT) and a multiplier and an Inverse Discrete Fourier Transform (IDFT) or Inverse Fast Fourier Transform (IFFT) followed by a low pass filter to perform convolution filter function, a baseband convolution filter comprising:
  a DFT or FFT function that converts the time domain subtraction of the delay and gain adjusted main baseband signal and the peak reduced main baseband signal to frequency domain and produces a frequency domain of the subtraction of the delay and gain adjusted main baseband signal and the peak reduced main baseband signal;
  a multiplier that multiplies a pre-configured frequency domain baseband signal and the frequency domain (DFT or FFT) of the subtraction of the delay and gain adjusted main baseband signal and the peak reduced main baseband signal;
  an IDFT or IFFT function that converts the output of a multiplier that multiplies a pre-configured frequency domain baseband signal and the frequency domain or output of the DFT (or FFT) of the subtraction of the delay and gain adjusted main baseband signal and the peak reduced main baseband signal to time domain;
  a low pass filter that filters the IDFT (or IFFT) of the output of a multiplier that multiplies a pre-configured frequency domain baseband signal and the frequency domain of or output of the DFT (or FFT) of the subtraction of the delay and gain adjusted main baseband signal and the peak reduced main baseband signal.

4. The reconditioning equalizer filter according to claim 1, wherein the digital baseband convolution filter uses a low pass filter followed by a Discrete Fourier Transform (DFT) or Fast Fourier Transform (FFT), and a multiplier, and an Inverse Discrete Fourier Transform (IDFT) or Inverse Fast Fourier Transform (IFFT) to perform convolution filtering function, a baseband convolution filter comprising:
  a low pass filter to filter the result of the subtraction of the delay and gain adjusted main baseband signal and the peak reduced main baseband signal;
  a DFT or FFT function that converts the low pass filtered result of the subtraction of the delay and gain adjusted main baseband signal and the peak reduced main baseband signal to frequency domain;
  a multiplier that multiplies a pre-configured frequency domain baseband signal and DFT or FFT of the low pass filtered result of the subtraction of the delay and gain adjusted main baseband signal and the peak reduced main baseband signal;
  an IDFT or IFFT function that converts the output of a multiplier that multiplies a pre-configured frequency domain baseband signal and the frequency domain of or output of the DFT (or FFT) of the low pass filtered subtraction of the delay and gain adjusted main baseband signal and the peak reduced main baseband signal to time domain.

5. The reconditioning equalizer filter according to claim 1, wherein a controller using the input and the output of the reconditioning equalizer filter controls the delay and gain adjustment functions used in reconditioning equalizer filter, the normalization threshold values including the normalization values, and provides the preconfigured frequency domain baseband signal to be used for the second input of the multiplier used in the convolution function.

6. The enhanced reconditioning equalizer filter according to claim 1, when it is used in any wireless and wireline communication transmitter, in wireless cellular, wireless PCS, wireless LAN, Wireless WAN, Wireless Broadband, microwave, wireless satellite, WiMax, wireless audio and video broadcasting, any wireline broadband cable and Digital Subscriber Line (DSL) transmitter, optical transmitters, and any wireless communication systems used for military applications.

7. The enhanced reconditioning equalizer filter according to claim 1, wherein the Digital Signal Processing (DSP) function can be implemented in programmable logic, Field Programmable Gate Array (FPGA), Gate Array, Application Specific Integrated Circuit (ASIC), and DSP processor.

* * * * *